Nov. 20, 1956　　　F. P. SHARPE　　　2,771,173
TRANSFER MECHANISM
Filed Feb. 25, 1952　　　　　　　　　　5 Sheets-Sheet 1
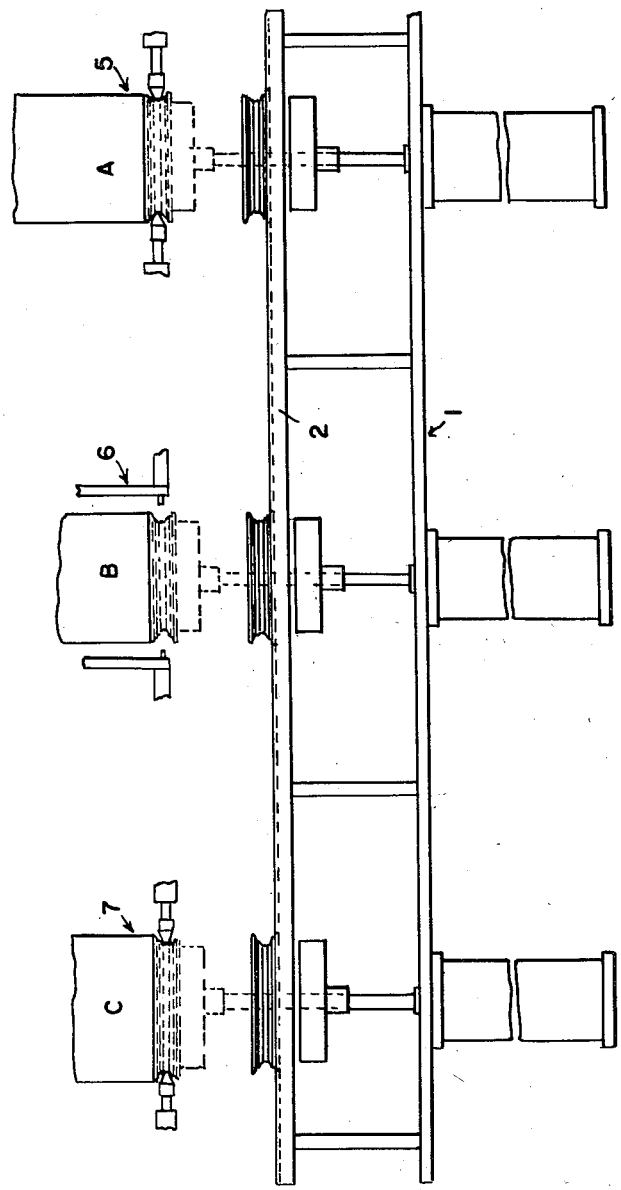
INVENTOR.
FREDERICK P. SHARPE
BY
ATTORNEYS Nov. 20, 1956  F. P. SHARPE  2,771,173
TRANSFER MECHANISM
Filed Feb. 25, 1952  5 Sheets-Sheet 2

INVENTOR.
FREDERICK P. SHARPE
BY
Whittemore Hulbert + Belknap
ATTORNEYS

Nov. 20, 1956   F. P. SHARPE   2,771,173
TRANSFER MECHANISM
Filed Feb. 25, 1952   5 Sheets-Sheet 3
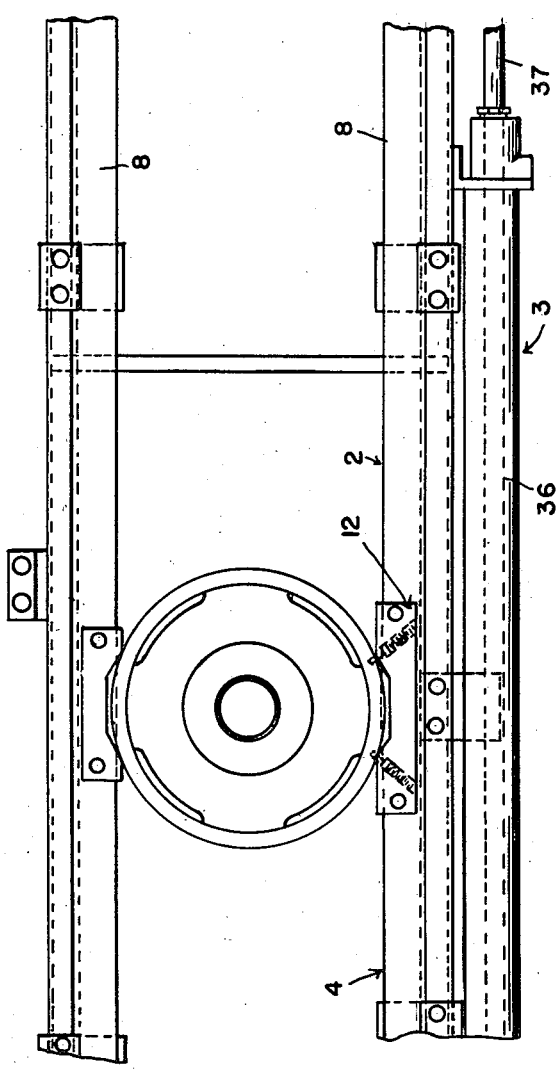
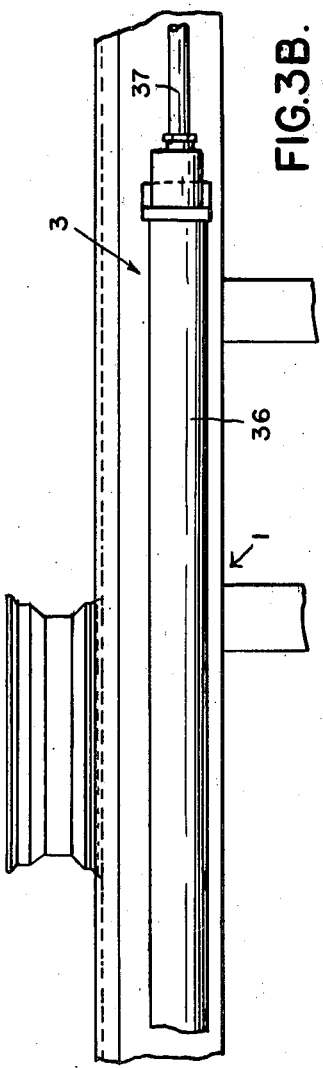
*INVENTOR.*
FREDERICK P. SHARPE
BY
*Whittemore Hulbert & Belknap*
ATTORNEYS

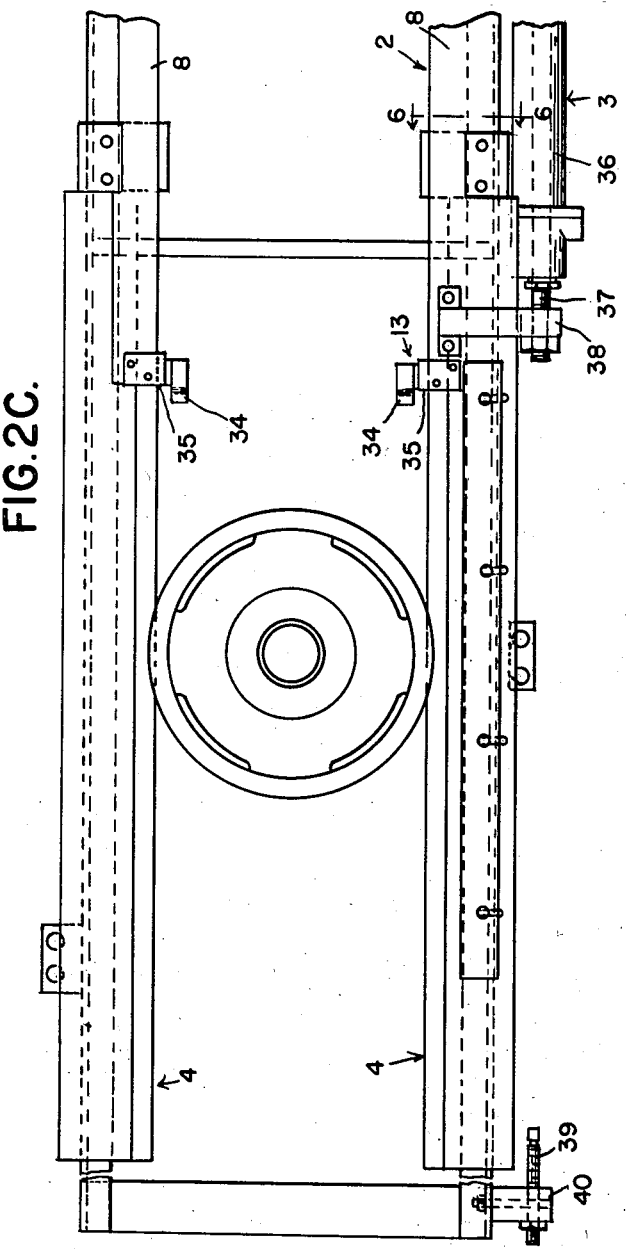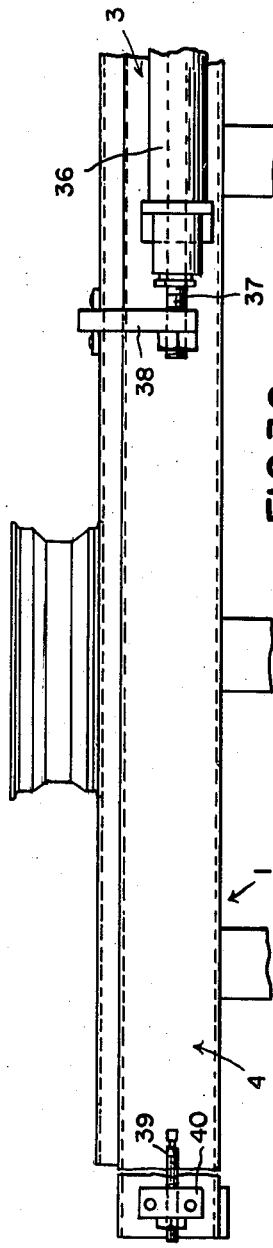

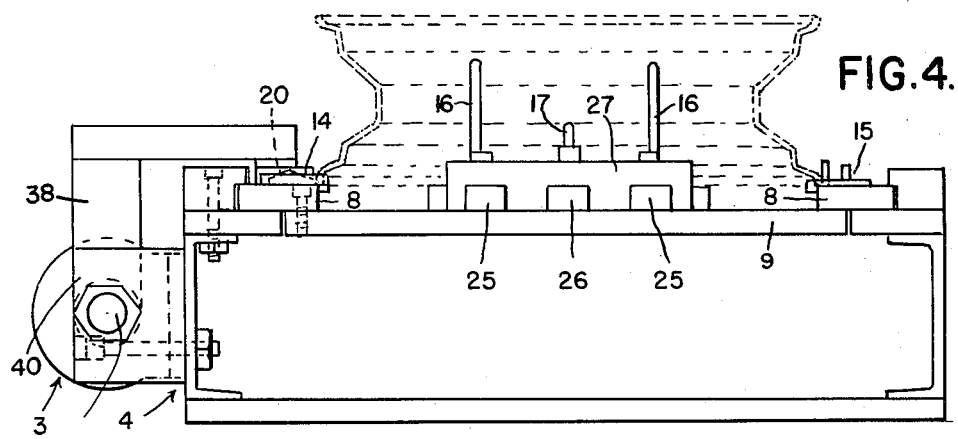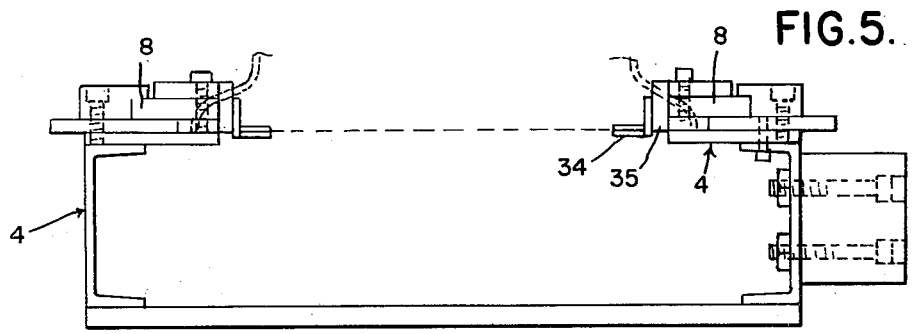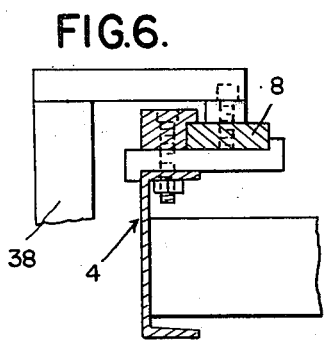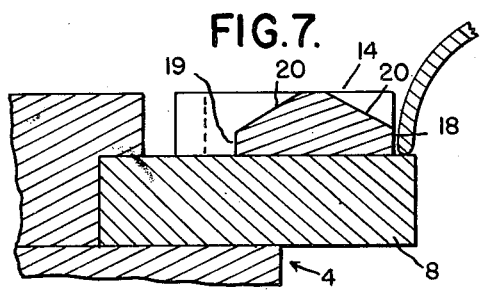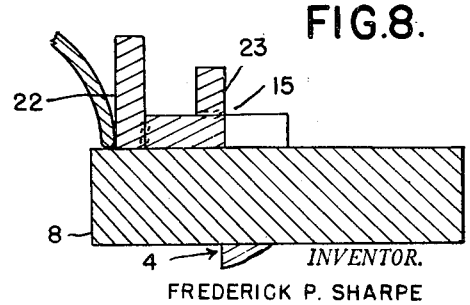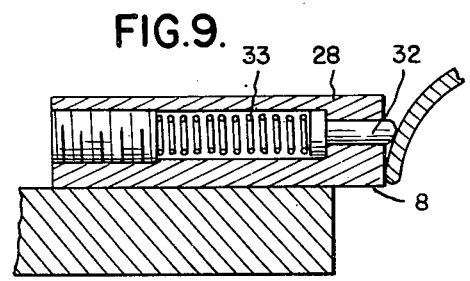

United States Patent Office 2,771,173
Patented Nov. 20, 1956

2,771,173

TRANSFER MECHANISM

Frederick P. Sharpe, Dearborn, Mich., assignor to Kelsey-Hayes Wheel Company, Detroit, Mich., a corporation of Delaware Application February 25, 1952, Serial No. 273,187

4 Claims. (Cl. 198—19)

The invention relates to mechanism for transferring articles to successive work stations and refers more particularly to mechanism for intermittently transferring or advancing wheel body and rim assemblies to successive work stations at which are located various machines for carrying out various operations on the assemblies.

The invention has for one of its objects to provide an improved transfer mechanism which is simple in construction and effective in operation.

The invention has for another object to provide a transfer mechanism which intermittently transfers the articles from one station to a succeeding station and accurately positions the articles at the succeeding station.

The invention has for further objects to provide an improved transfer device having article engaging and positioning abutments which are adjustably mounted; and to provide an improved transfer device having positioning abutments which in addition to being adjustably mounted are individually reversible to handle articles of different diameters.

With these and other objects in view, the invention resides in the novel features of construction and combinations and arrangements of parts as more fully hereinafter set forth.

In the drawings:

Figure 1 is a diagrammatic side elevation partly in section illustrating the transfer mechanism embodying the invention;

Figures 2A, 2B and 2C are top plan views of successive portions of the transfer mechanism;

Figures 3A, 3B and 3C are corresponding side elevations thereof;

Figures 4 and 5 are respectively front and rear end views thereof;

Figure 6 is a cross section on the line 6—6 of Figure 2C;

Figure 2A:
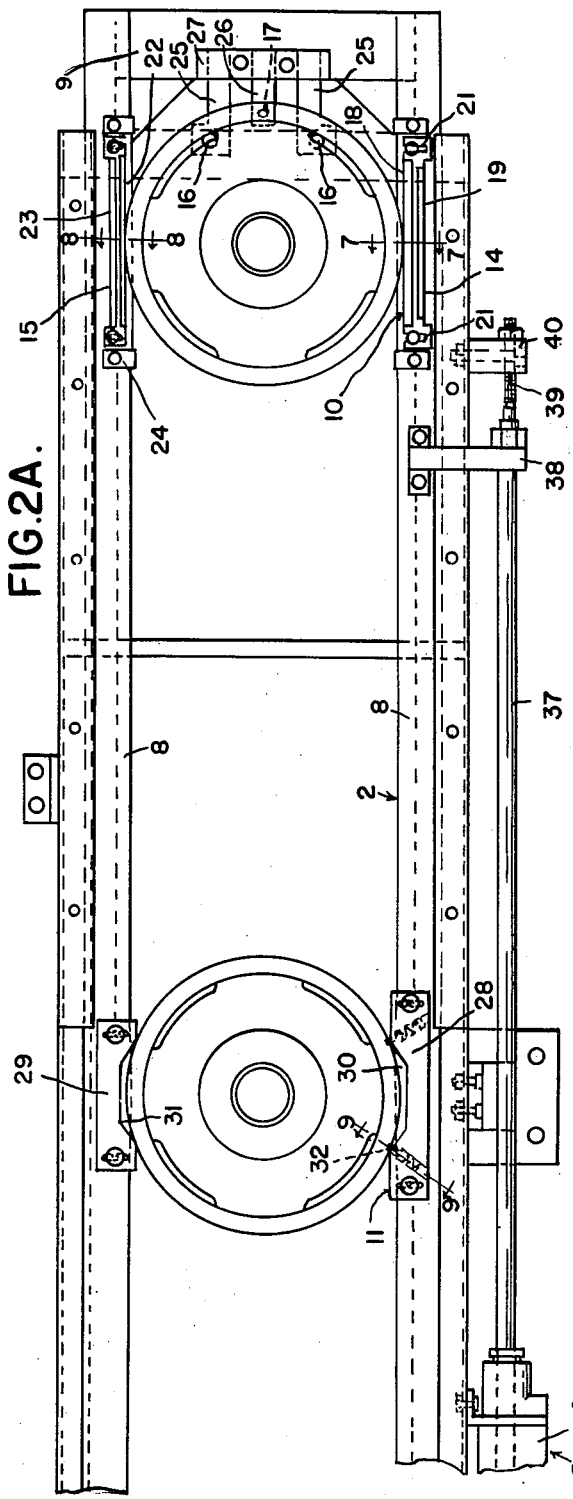
Figure 3A:
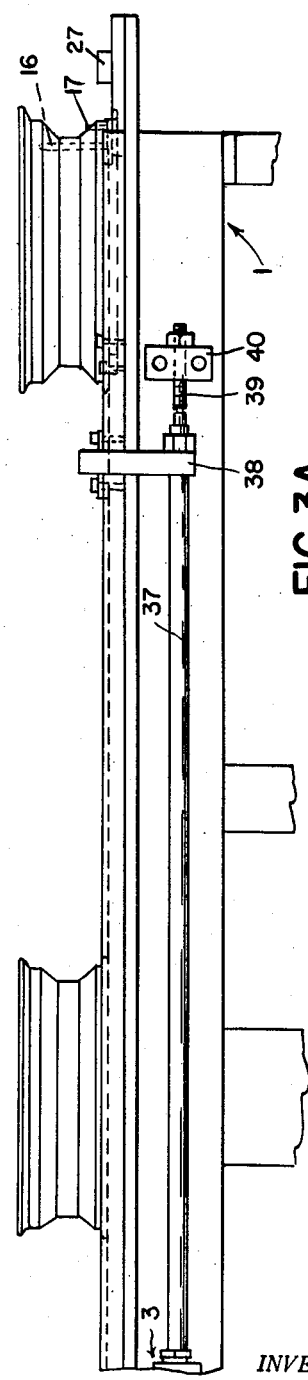

Figures 7 and 8 are enlarged cross sections on the line 7—7 and 8—8 respectively of Figure 2A;

Figure 9 is an enlarged cross section on the line 9—9 of Figure 2A.

As illustrated in the present instance, the transfer mechanism is designed to intermittently advance wheel body and rim assemblies to successive work stations at which are located an assembling and piercing machine, a rivet inserting machine and a rivet heading machine.

The transfer mechanism comprises the supporting frame work 1, the transfer member 2 reciprocably mounted on the frame work, and the fluid pressure operated cylinder 3 operatively connected to the transfer member for intermittently reciprocating the member.

The supporting frame work has the horizontal spaced parallel supports 4 which extend past and more particularly through the work stations A, B and C which are equally spaced from each other and arranged in line and at which are located the assembling and piercing machine 5, the rivet inserting machine 6 and the rivet heading machine 7 which are diagrammatically illustrated in Figure 1. The assembling and piercing machine is practically of the same construction as illustrated in my copending application, Serial No. 121,866, filed October 17, 1949, Patent No. 2,594,506 issued April 29, 1952, and the rivet heading machine is similar in construction to the assembling and piercing machine using rivet heading mechanism instead of piercing mechanism. The rivet inserting machine is practically of the same construction as illustrated in my copending application, Serial No. 157,793, filed April 24, 1950. These machines have vertical axes with which the axes of the wheel body and rim assemblies register, and in the present instance the vertical axes of the machine are in line.

The transfer member 2 is a U-shaped slide having the spaced parallel bars 8, the transverse bar 9 only at the front ends of the bars 8, the devices 10, 11 and 12 on the transfer slide for laterally and longitudinally positioning the wheel body and rim assemblies with respect to the transfer slide and the ejector device 13 on the transfer slide for ejecting the wheel body and rim assemblies.

The device 10 comprises the abutment bars 14 and 15 and the upright pair of pins 16 and intermediate pin 17. The abutment bars 14 and 15 are opposed with one adjustably mounted on and secured to each bar 8 so that the abutment bars may be adjustably moved toward and away from each other. The abutment bar 14 has the laterally inner and outer abutment shoulders 18 and 19 engageable with the rim for laterally positioning the same with respect to the transfer slide. The abutment bar also has the downwardly diverging faces 20 leading to the shoulders and adapted to engage the rim and guide the same to the shoulders. Furthermore, the abutment bar 14 has at its ends the transverse open ended slots 21 for receiving the bolts to secure the abutment bar to its bar 8. The shoulders 18 and 19 are non-symmetrically disposed with respect to or offset at different distances from the longitudinal centers of the slots 21. The abutment bar 15 has the laterally inner and outer shoulders 22 and 23 for engaging the rim and laterally positioning the same with respect to the transfer slide. The abutment bar also has the transverse slots 24 at its ends for receiving the bolts for securing the abutment bar to its bar 8. The shoulders 22 and 23 are non-symmetrically disposed with respect to or offset at different distances from the longitudinal centers of the slots 24. Both of the abutment bars 14 and 15 are secured to the bars 8 with their laterally inner shoulders spaced laterally outwardly from the laterally inner edges of the bars 8 so that the bars 8 engage the rim and support the wheel body and rim assembly. The construction of the abutment bars provides for adjustably securing the abutment bars to their respective bars of the transfer slide and also provides for individually reversing the abutment bars so that they can locate the wheel body and rim assembly laterally of the transfer slide within the desired limits and they may be used with wheel body and rim assemblies of different diameters. The pair of upright pins 16 and the intermediate upright pin 17 are mounted on the rear ends of the side fingers 25 and intermediate finger 26. The fingers extend transversely rearwardly of the transverse bar 9 and into downwardly opening channels of the clamp 27 which is secured to the transverse bar 9 and clamps the fingers thereagainst. The construction is such that the fingers are adjustable longitudinally of the transfer frame. The pair of upright pins 16 are positioned to engage opposite sides of a spoke of a wheel body and the intermediate upright pin 17 is adapted to engage the valve stem hole of the rim whereby the wheel body and rim are predeterminedly angularly positioned with respect to each other and the transfer slide. Also, the fingers being adjustable longitudinally of the transfer slide predeterminedly longitudinally position the wheel body and rim with respect to the transfer slide.

The construction of the device 10 is such that the abutment bars 14 and 15 laterally position the rim with respect to the transfer slide and the pins 16 and 17 longitudinally position the rim with respect to the transfer slide as well as angularly position the wheel body and rim with respect to each other and the transfer slide.

The device 11 comprises the abutment bars 28 and 29 which are opposed with one adjustably mounted on and secured to each bar 8 so that the abutment bars may be adjustably moved toward and away from each other. The abutment bars respectively have the recesses 30 and 31 in their laterally inner or opposed edges for receiving diametrically opposite portions of a rim, each recess having inclined sides for engaging a rim and positioning the same both laterally and longitudinally of the transfer slide. The abutment bar 28 also carries the diagonally arranged pins 32 which extend transversely of the sides of the recess and converge laterally inwardly of the transfer slide and are slidably mounted in the abutment bar and are urged laterally inwardly by means of the coil springs 33 but held from disengagement from the abutment bar by the heads upon the pins engageable with the shoulders in the bores in the abutment bar for receiving the pins. The pins are adapted to extend slightly over the lower tire retaining flange of the rim to yieldably hold the rim down. The abutment bars are secured to their bars 8 locating the rim receiving recesses over the bars 8 so that a rim positioned by the inclined sides of the recesses rests upon and is supported by the bars 8.

The device 12 is constructed and operates in the same manner as the device 11.

The ejector device 13 is located at the rear end of the transfer slide and comprises the ledges 34 and abutment blocks 35 fixedly secured to the rear ends of the bar 8. The ledges are adapted to engage under the adjacent portions of a rim and slightly raise the rim and the abutment blocks are adapted to engage and push the rim with its wheel body along and off the support 4.

The devices 10, 11 and 12 are spaced from each other longitudinally of the transfer slide the same distance as the distance between the work stations A, B and C so that when the transfer slide is reciprocated through this distance the devices at the forward end of the stroke are in positions to receive the wheel body and rim assemblies and at the rearward end of the stroke are in positions registering the assemblies within the necessary limits with the adjacent rearwardly located work stations. More particularly, the device 10 at the forward end of the stroke is in loading position or at the loading station to receive a rim and a wheel body loosely assembled with the rim, and this device at the rearward end of the stroke is positioned in registration with the work station A to register within the necessary limits the transferred loose assembly of rim and wheel body with this work station. The device 11 at the forward end of the stroke is positioned in registration with the work station A to receive the wheel body and rim assembly at this work station and at the rearward end of the stroke is positioned in registration with the work station B to register the transferred wheel body and rim assembly within the necessary limits with this work station. The device 12 at the forward end of the stroke is positioned in registration with the work station B to receive the wheel body and rim assembly at this work station, and at the rearward end of the stroke is positioned in registration with the work station C to register the transferred wheel body and rim assembly within the necessary limits with this work station. Also, the ejecting device 13 at the forward end of the stroke is positioned forwardly of the work station C to engage the rim of the wheel body and rim assembly at this station upon rearward movement of the transfer slide and at the rearward end of the stroke is positioned to discharge the transferred wheel body and rim assembly onto a conveyor at the rear end of the support for the transfer slide.

The fluid pressure operated cylinder 3 for reciprocating the transfer slide comprises the cylinder 36 which extends longitudinally of and is fixedly mounted on the support 4 at one side thereof and the piston rod 37 which is secured to a piston slidably within the cylinder 36. The rod extends through both ends of the cylinder and is secured at its free ends to the brackets 38 which extend over the supports 4 and are secured to the adjacent bar 8 of the transfer slide 2. To control the stroke so that the transfer slide will be reciprocated the same distance as that between adjacent work stations, each end of the piston rod extends beyond its bracket and is adapted to abut the stop pin 39 which is adjustably secured to the bracket 40 mounted upon the support.

In operation and assuming the transfer slide 2 to be in its forward position, a rim is placed upon the bars 8 of the transfer slide between and engaging the abutment shoulders of the bars 14 and 15 of the positioning device 10 and with its valve stem hole engaged by the intermediate pin 17 of the positioning device. The wheel body is then placed upon the rim with opposite sides of a spoke engaged by the fingers 16 of the positioning device. The transfer device is then moved to its rearward position by admitting fluid under pressure such as air to the forward end of the cylinder 36. At this time the wheel body and rim assembly are in registration with the work station A and more particularly the assembling and piercing machine 5. The mechanism of this machine for raising the wheel body and rim assembly is put into operation and the wheel body and rim are telescoped after which the ends of the spokes of the wheel body and the base of the rim are pierced to form rivet holes. During this operation the transfer frame is moved in the forward direction by admitting compressed air to the rear end of the cylinder 36 to again receive a loose assembly of rim and wheel body and locate the positioning device 11 next in rear of the positioning device 10 in registration with the work station A and more particularly the assembling and piercing machine 5 so that when the raising and lowering mechanism is operated the pierced wheel body and rim assembly will be deposited on the transfer slide and in the positioning device 11. Then the transfer slide is again moved rearwardly to position the loose wheel body and rim assembly in registration with the station A and more particularly the assembling and piercing machine 5 and the pierced wheel body and rim assembly in registration with the work station B and more particularly the rivet inserting machine 6. At this time the raising and lowering mechanisms of the assembling and piercing machine and the rivet inserting machine are put into operation to raise the assemblies, after which the assembling and piercing machine carries out its assembling and piercing steps and the rivet inserting machine carries out its steps of inserting rivets into the pierced holes. During this time, the transfer slide is again moved forwardly to register the devices 11 and 12 with the work stations A and B to respectively receive the pierced assembly and the rivet inserted assembly and to position the device 10 to receive the loose assembly. The transfer slide is then moved rearwardly to its rear position to register the rivet inserted assembly with the work station C and more particularly the rivet heading machine 7, the pierced assembly with the work station B and more particularly the rivet inserting machine 6 and the loose assembly with the work station A and more particularly the assembling and piercing machine 5. The raising and lowering mechanisms are then operated to raise the assemblies to their upper positions after which the assembling and piercing is effected by the assembling and piercing machine, the insertion of the rivets is carried out by the rivet inserting machine and the rivets are headed by the rivet heading machine. During this time, the transfer slide is moved to its forward position after which the loose assembly is placed in the device 10, the pierced and riveted inserted assemblies are deposited in the devices 11 and 12 respectively and the headed over riveted assembly is deposited in rear of the ejector device 13. Then the transfer slide is moved rearwardly to transfer or advance the assemblies during which the ejector device moves the completed assembly to the conveyor at the rear end of the support for the transfer slide. This transfer cycle may be continued as long as desired.

What I claim as my invention is:

1. Mechanism for transferring wheel body and rim assemblies to successive work stations spaced from each other comprising a reciprocable member extending through the work stations for engaging the rims and supporting the assemblies, devices on said member spaced from each other the same distances as the corresponding work stations are spaced from each other, said devices each having a pair of opposed abutment bars for engaging the rims and positioning the assemblies and a pair of spring urged pins on one bar of each pair of opposed bars and movable transversely of said one bar for engaging the rims and holding the same on said member, and means operatively connected to said member for reciprocating the same from a position at the rearward end of the stroke locating said devices in positions registering the assemblies with the work stations to a position at the forward end of the stroke locating said devices in positions to engage the rims of the adjacent forwardly located assemblies.

2. Work transfer mechanism comprising a movable member, a device on said member having spaced opposed abutment bars for engaging and positioning the work on said member, said bars having opposed recesses on their adjacent sides for receiving opposite portions of the work, spring urged pins projecting from the corners of the recess in one of said bars in converging relation toward the other bar, and means for moving said member.

3. Mechanism for transferring wheel body and rim assemblies to successive equally spaced work stations arranged in line comprising spaced parallel supports extending through the stations, a reciprocable member having spaced parallel bars movable on said supports for engaging the rims and supporting the assemblies, devices on said member for engaging the rims and positioning the assemblies with respect to said member, said devices being spaced from each other longitudinally of said member the same distance as the distance between said stations and each comprising a pair of opposed abutment members on the respective bars having opposed recesses on their inner sides for receiving diametrically opposite portions of the rim, a pair of spring urged pins projecting inwardly from the corners of the recesses in one abutment member of each pair for engaging the rims and holding the same on said movable member, and means operatively connected to said reciprocable member for reciprocating the same from a position at the rearward end of the stroke locating said devices in positions registering the assemblies with the work stations to a position at the forward end of the stroke locating said devices in positions to engage the rims of the adjacent forwardly located assemblies.

4. The mechanism set forth in claim 3, in which said abutment members are on the top side of said bars and said recesses expose portions of the top side of said bars for supporting diametrically opposed portions of the rim within said recesses, and in which said pins are spaced above said bars to extend over the lower tire retaining flange of the rim to hold down the latter.

References Cited in the file of this patent

UNITED STATES PATENTS

| 1,426,039 | Candee | Aug. 15, 1922 |
| 2,004,816 | Lindgren | June 11, 1935 |
| 2,404,460 | Rolker | July 23, 1946 |